United States Patent
Bijlenga et al.

(10) Patent No.: US 7,173,349 B2
(45) Date of Patent: Feb. 6, 2007

(54) EQUIPMENT AND METHOD FOR EXCHANGING POWER, IN SHUNT CONNECTION, WITH AN ELECTRIC POWER NETWORK, AND USE OF SUCH EQUIPMENT

(75) Inventors: Bo Bijlenga, Åmål (SE); Mojtaba Noroozian, Västerås (SE); Björn Thorvaldsson, Kolbäck (SE)

(73) Assignee: ABB AB, Västerås (SE)

( * ) Notice: Subject to any disclaimer, the term of this patent is extended or adjusted under 35 U.S.C. 154(b) by 0 days.

(21) Appl. No.: 10/501,076

(22) PCT Filed: Jan. 7, 2003

(86) PCT No.: PCT/SE03/00015

§ 371 (c)(1),
(2), (4) Date: Jan. 27, 2005

(87) PCT Pub. No.: WO03/069757

PCT Pub. Date: Aug. 21, 2003

(65) Prior Publication Data
US 2005/0116691 A1 Jun. 2, 2005

(30) Foreign Application Priority Data
Jan. 9, 2002 (SE) .................................... 0200050

(51) Int. Cl.
G05F 1/10 (2006.01)
H01H 47/02 (2006.01)
H01H 51/34 (2006.01)

(52) U.S. Cl. ........................................ 307/98; 323/205

(58) Field of Classification Search .................. 307/98, 307/31, 87; 323/205
See application file for complete search history.

(56) References Cited

U.S. PATENT DOCUMENTS 6,411,067 B1 * 6/2002 Bjorklund .................... 323/207

(Continued)

FOREIGN PATENT DOCUMENTS

CN 2302498 3/1999

(Continued)

OTHER PUBLICATIONS

Bijlenga, Bo et al., "SVC Light—a powerful tool for power quality improvement", ABB Review, Jun. 1998, pp. 21-30.

(Continued)

Primary Examiner—Chau N. Nguyen
Assistant Examiner—Carlos Amaya
(74) Attorney, Agent, or Firm—Venable LLP; Eric J. Franklin

(57) ABSTRACT

Equipment for exchanging power, in shunt connection, with an electric power network. A reactive impedance element and a voltage source converter provide mutual connection in series. The power network has a nominal voltage of a fundamental frequency and a given phase position. The converter is intended for generating a fundamental-tone voltage within a control range which limits the amplitude of the fundamental-tone voltage. The control range limits the amplitude of the fundamental-tone voltage to a value that is lower than the nominal voltage of the power network and comprises generation of a reactive component of the fundamental-tone voltage with a phase position that either coincides with the phase position for the voltage of the power network, or that deviates by 180° electrically form the phase position for the voltage of the power network.

12 Claims, 3 Drawing Sheets

U.S. PATENT DOCUMENTS

2004/0052015 A1* 3/2004 Angquist et al. ............. 361/22

FOREIGN PATENT DOCUMENTS

| DE | 197 38 125 A1 | 3/1999 |
| WO | WO 97/49157 A1 | 12/1997 |

OTHER PUBLICATIONS

Ashari, M. et al., "Mitigation of Line and Neutral Harmonics in Three-Phase Distribution Systems", Pub-Conference Record of the 2000 IEEE Industry Applications Conference, vol. 5, Oct. 8-12, 2000, pp. 3166-3171.

* cited by examiner

EQUIPMENT AND METHOD FOR EXCHANGING POWER, IN SHUNT CONNECTION, WITH AN ELECTRIC POWER NETWORK, AND USE OF SUCH EQUIPMENT

TECHNICAL FIELD

The present invention relates to equipment for exchanging power, in shunt connection, with an electric power network, a method for this purpose, and use of such equipment for this purpose.

The equipment comprises a reactive impedance element and a voltage source converter for mutual connection in series.

BACKGROUND ART

Compensation of reactive power flows in electric power networks conventionally occurs, inter alia, by connection of reactive impedance elements, whereby is meant in this context inductors and capacitors, in shunt connection to the power network. By connection of a thyristor switch, essentially comprising two thyristor valves in antiparallel connection, in series with an inductor, the current through the inductor may be controlled and hence also the exchange of reactive power by the device with the power network (Thyristor Controlled Reactor—TCR). In a similar manner, capacitors may be respectively connected to and disconnected from the power network by means of electric switching devices, for example thyristor switches, whereby the reactive power supplied to the power network may be controlled in steps (Thyristor Switched Capacitor—TSC). Fixed capacitors also often occur in combination with TCRs and combinations of TSCs and TCRs, which makes possible a continuous control of the reactive power exchange with the power network.

Capacitors connected in shunt connection are used primarily in industrial networks to compensate for the reactive power consumption in, for example, large asynchronous motors. Other typical applications, where often a combination of fixed capacitors and TCRs is advantageous, is in connection with loads with a greatly varying reactive power consumption, such as, for example, in arc furnaces. In certain cases, it may be suitable to connect the compensation equipment to the industrial network via a transformer.

With the arrival of Voltage Source Converters (VSCs), equipped with series-connected transistors (IGBT), it has been possible to use this kind of converters for relatively high voltages. Control by means of pulse-width modulation (PWM) allows a rapid control of the voltage generated by the converters. Converters of this kind thus constitute a device that enables a rapid control of a generated ac voltage, both with respect to amplitude and phase position.

With the converter connected to a power network with a certain fundamental frequency, nominally usually 50 or 60 Hz, the voltage generated by the converter is brought to comprise a component of the fundamental frequency, in the following referred to as the fundamental voltage, but in addition thereto, because of the pulse-width modulation, also components of other frequencies.

However, in the following, only the fundamental voltage is taken into consideration.

It is known to connect such a voltage source converter to an industrial network to achieve a rapidly controllable reactive power exchange with the network—see, for example, ABB Review 6/98 pp 21–30: SVC Light—A powerful tool for power quality improvement (Bo Bijlenga, Rolf Grünbaum, Thomas Johansson).

The connection of the converter is made in these known applications via phase inductors, which are normally dimensioned such that, at the rated current of the converter, they take up about 10–30% of the network's nominal voltage of fundamental frequency. The converter is brought to generate a voltage, the fundamental component of which, both with regard to frequency and phase position, essentially coincides with the voltage of the network (to cover active losses in converters and phase inductors, the phase position must deviate somewhat from the phase position for the voltage of the network; this is disregarded in this reasoning on principles), and by varying the amplitude of the generated voltage, the converter may be brought to consume reactive power, if its voltage has a lower amplitude than that of the network, and to generate reactive power, respectively, if its voltage has a higher amplitude than that of the network. Since, in industrial networks, the task is normally to generate reactive power, the voltage source converter is normally supplemented by a capacitor, which may possibly be connectible in steps.

Thus, according to the above-mentioned technique, the converter must be dimensioned for a voltage equal to the nominal voltage of the network plus a control range for generation of reactive power.

However, it often proves that such a configuration leads to the converter not being capable of being utilized in full with respect to its capacity to carry current, and this also means that it becomes overdimensioned with respect to current. To achieve a better utilization of the converter, it may then be connected via a transformer, which changes the ratio of current to voltage in the converter and hence enables a better utilization. This, however, entails an additional component in the installation.

Inductors coupled in shunt are primarily used in high-voltage transmission networks with overhead lines but also in transmission networks with cables, in the latter case also at lower voltages.

The purpose of this is above all to suppress overvoltages that may arise in connection with switching operations in the transmission network and to counteract voltage rises along a transmission line at low load. On the other hand, this means that the inductor, at increasing load, contributes to a non-desired voltage drop along the line.

It is known to use an inductor, connectible by means of a switch, with a fixed inductor to counteract voltage variations along the line at varying load. However, this control of the reactive power exchange with the transmission network is discontinuous and, in comparison with the above-mentioned overvoltages, relatively slow. In this case, the task of the fixed inductor is to reduce overvoltages in connection with sudden voltage rises caused, for example, by switching operations in the power network. The fixed inductor may be equipped with a thyristor switch of the kind mentioned above in connection with TCRs. Such a solution, however, entails a limited control speed, caused by the mode of operation of the thyristor switch.

SUMMARY OF THE INVENTION

It is an object of the invention to provide equipment of the kind described in the introductory part of the description for use in industrial networks, which equipment, without the use of a transformer, allows improved utilization of the converter, and to provide a method for this object.

It is a further object of the invention to provide equipment of the kind described in the introductory part of the description for use in high-voltage transmission lines, which equipment allows a rapid and continuous control of the power exchange with the transmission line, and to provide a method for this object.

According to the invention, these objects are achieved by dimensioning the voltage source converter for a control range that limits the amplitude of the fundamental voltage to a value that is lower than the nominal voltage of the power network and comprises generation of a reactive component of the fundamental voltage with a phase position that either coincides with the phase position for the voltage of the power network or that deviates by 180° electrically from the phase position for the voltage of the power network.

In an advantageous further development of the invention, the control range of the converter comprises, in addition thereto, generation of an active component of the fundamental voltage with a phase position that deviates from the phase position for the voltage of the power network by +90° electrically or by −90° electrically and with an amplitude that brings about an exchange of active power with the power network.

In another advantageous further development, the equipment comprises a control system for controlling, in dependence on electric variables sensed in the power network, the fundamental voltage generated by the converter with regard to amplitude and phase position within the control range, whereby the control system comprises a signal-processing member with a phase-advancing characteristic in a frequency interval surrounding the frequency 8.8 Hz and means for forming a reference value for the current of the converter in dependence on an output signal from said signal-processing member.

Additional advantageous further developments of the invention will become clear from the following description and claims.

BRIEF DESCRIPTION OF THE DRAWINGS

The invention will be described in greater detail by description of embodiments with reference to the accompanying drawings, which are all schematic and in the form of single-line diagrams, diagrams, and block diagrams, and wherein.

DESCRIPTION OF PREFERRED EMBODIMENTS

The following description relates to the method as well as the device.

The invention will be explained below by means of a comparative example of prior art.

Figure 1:
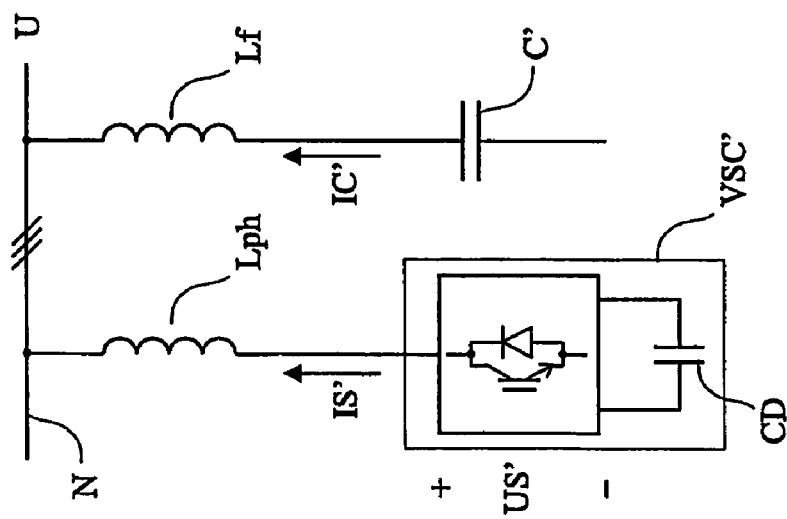
FIG. 1 shows a piece of equipment with a voltage source converter and an inductive impedance element for compensation of reactive power according to the prior art.

FIG. 1 shows the main circuits in three-phase equipment for compensation of reactive power carried out according to the prior art. The equipment comprises a capacitor bank C' and a voltage source converter VSC', connected to a power network N with a voltage U and with a fundamental frequency (f). The nominal voltage of the power network is referred to in the following as Un. Typically, the power network N may be an industrial network with a voltage 36 kV. The capacitor bank is shown in this context simplified as a capacitor C' connected to the power network via a filter inductor Lf. In practice, however, the capacitor C' is usually distributed among a plurality of capacitors, each one being connected to the power network via a respective filter inductor for tuning and filtering of selected harmonics in the power network.

The converter is connected to the power network via phase inductors Lph. Through the capacitor C', a current IC' flows, and through the converter a current IS' flows. The voltage on the phase terminal of the converter is designated US'.

As mentioned above, only the component of the fundamental frequency (nominally usually 50 Hz or 60 Hz) of currents and voltages is taken into consideration in the following. Further, for the sake of simplicity, currents, voltages and powers are expressed, in a manner known per se, in per units.

Let it be assumed that the equipment is to be able to generate a reactive power that is continuously controllable in the range of 0.5–1.0 per unit. According to the prior art, a preferred dimensioning of the components included is then for the capacitor C' to generate a reactive power of 0.75 per unit at a voltage of the power network of 1.0 per unit. Consequently, the reactive power flow from the converter VSC, and the phase inductor Lph shall then be continuously controllable within the interval +/−0.25 per unit, which is equivalent to these components, at a voltage of the power network equal to 1.0 per unit, being traversed by a current IS' equal to +/−0.25 per unit. Let it be assumed that the phase inductor Lph is dimensioned such that, at the current 0.25 per unit, the voltage drop across this amounts to 0.20 per unit. This means that when the converter is to generate a reactive power of 0.25 per unit, its voltage US' must be equal to the line voltage plus the voltage drop across the phase inductor, that is, equal to 1.20 per unit. Thus, the converter must be dimensioned for a voltage of 1.20 per unit and for an apparent power equal to 1.20×0.25 =0.30 per unit.

It is to be noted that, in this case, the voltage generated by the converter has the same phase position as the line voltage U.

Figure 2:
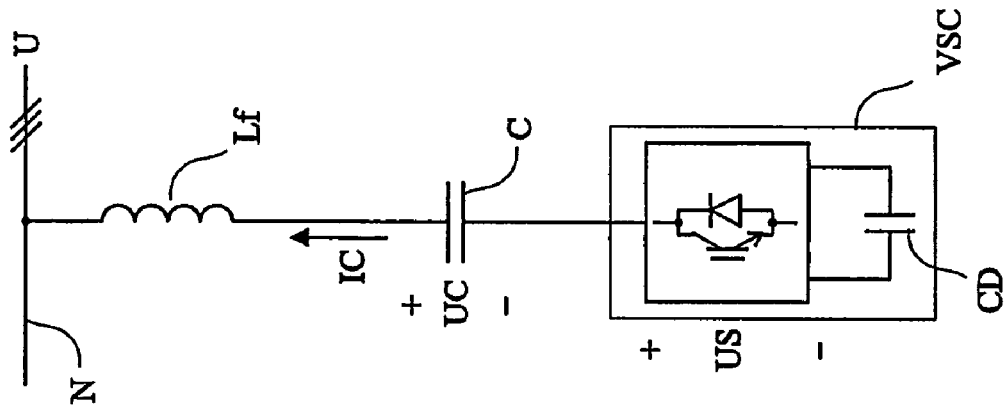
FIG. 2 shows an embodiment of the invention with a voltage source converter and a capacitive impedance element.

According to an embodiment of the invention illustrated in FIG. 2, a voltage source converter VSC is now connected to the power network N via a capacitor C and a filter inductor Lf. Through the converter and the capacitor, a current IC flows, and the voltage of the phase terminal of the converter is designated US. In the following, the voltage drop of fundamental frequency across the filter inductor Lf is omitted.

With the same requirements for continuously controllable reactive power generation as in the example above, the capacitor C is dimensioned preferably such that, at the current IC equal to 1.0 per unit, it generates a reactive power of 1.33 per unit. The impedance of the capacitor expressed in per unit is thus 1.33 and at the current IC equal to 1.0 per unit, the voltage UC across the capacitor is thus equal to 1.33 per unit. By controlling the fundamental voltage of the converter to −0.33 per unit, the current IC will thus be equal to 1.0 per unit, and by controlling the fundamental voltage of the converter to +0.33 per unit, the current IC becomes equal to 0.5 per unit. In this embodiment of the invention, the converter is thus dimensioned for a control range in voltage amplitude of +/−0.33 per unit.

A comparison between the equipment according to the prior art described above and the present embodiment of the invention thus shows that the capacitor forming part of the prior art shall be dimensioned for an apparent power of 0.75 per unit whereas according to the invention it shall be dimensioned for an apparent power of 1.33 per unit. However, what is an advantage with the invention from an economic point of view is that the converter according to the prior art must be dimensioned for a voltage equal to 1.20 per unit, whereas according to the invention it needs to be dimensioned only for a voltage equal to 0.33 per unit. This normally implies that the number of series-connected semiconductor devices in the converter may be reduced. To satisfy the need of current capacity for the converter, normally only a component, available per se, with a suitable current-handling capacity needs to be resorted to.

It is to be noted that in this embodiment of the invention, the fundamental voltage US generated by the converter has a phase position that either coincides with the phase position of the voltage U of the power network or that deviates by 180° electrically from the phase position for the voltage of the power network (in this reasoning on principles, the fact that the phase position must deviate somewhat from the above-mentioned phase positions to cover active losses in the equipment is disregarded). The capacitor C is dimensioned for a voltage corresponding to the line voltage plus the voltage that the converter generates with an opposite phase position in relation to the line voltage.

Figure 3:
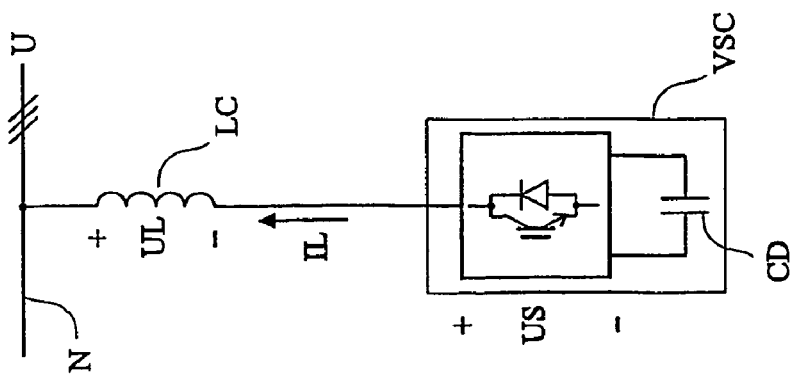
FIG. 3 shows an embodiment of the invention with a voltage source converter and an inductive impedance element.

FIG. 3 shows an embodiment of the invention for consumption of reactive power. The difference vis-à-vis the embodiment described with reference to FIG. 2 is that the capacitor bank C and the filter inductor Lf are replaced by an inductor LC, dimensioned for a voltage corresponding to the line voltage plus the voltage that the converter generates with an opposite phase position in relation to the line voltage. Through the converter and the inductor, a current IL flows. Otherwise, the mode of operation of this embodiment of the invention is completely analogous to what is described with reference to FIG. 2.

Figure 4:
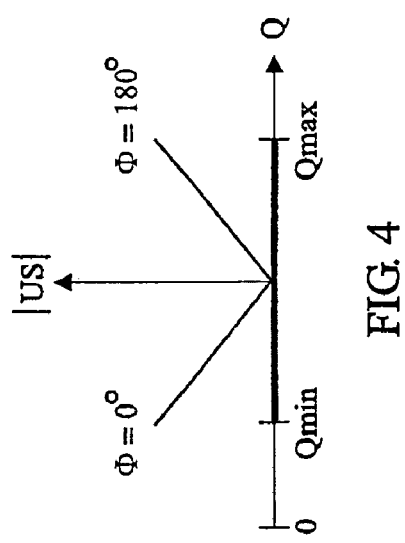
FIG. 4 shows a relationship between reactive power consumption and voltage generated by the converter in an embodiment of the invention according to FIG. 3.

The mode of operation of the embodiment of the invention shown in FIG. 3 is further illustrated in FIG. 4, which on the horizontal axis shows reactive power consumption and on the vertical axis the magnitude of the fundamental voltage US generated by the converter. In the area to the left of the vertical axis, the fundamental voltage generated by the converter has the phase position $\phi=0°$ electrically in relation to the phase position of the line voltage, in the area to the right of the vertical axis, the voltage generated by the converter has the phase position $\phi=180°$ electrically in relation to the phase position of the line voltage. The thick line on the horizontal axis illustrates how the reactive power consumption varies between a minimum value Qmin and a maximum value Qmax in dependence on the amplitude and phase position of the voltage generated by the converter.

Especially when the power network is in the form of a high-voltage transmission line, typically of a voltage level in the range of 132–500 kV, it is desirable to achieve a continuous and rapid control of a shunt-connected inductor. This may be advantageously achieved by utilizing a voltage source converter in a manner similar to that described above with reference to FIGS. 2 and 3, whereby, in this embodiment of the invention, a transformer is connected between the inductor and the converter in the manner illustrated in FIG. 5.

Figure 5:
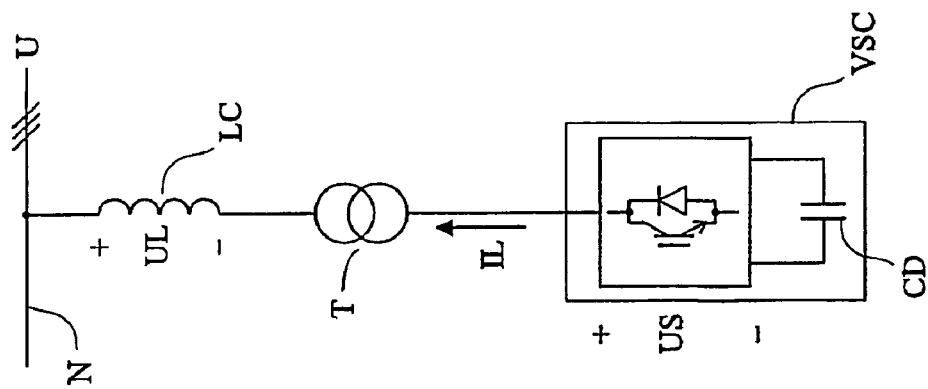
FIG. 5 shows a further embodiment of the invention with a voltage source converter and an inductive impedance element.

Compared with the equipment described with reference to FIG. 3, the equipment described in FIG. 5 shows, in addition thereto, a transformer T, connected between the inductor LC and the converter VSC. With a nominal voltage Un on the transmission line of 500 kV, the transformer may preferably be designed with a transformation ratio 132/20 to 36 kV. In the conceived case that a method analogous to that described with reference to FIG. 1 should be used, the converter must then be connected via a transformer with the transformation ratio 500/20 to 36 kV. Such a transformer is more expensive than a transformer dimensioned for, for example, a primary voltage of 132 kV. With equipment and a method according to the invention, a significant saving in transformer cost is thus obtained.

In the above-described examples of both prior art and of embodiments of the invention, it is required that the voltage generated by the converter be limited within a control range that does not bring about a voltage overload of the reactive impedance element. For the example of prior art described with reference to FIG. 1, this means in principle that the control range of the converter with respect to amplitude is to be limited to an interval of 0.8 to 1.2 per unit with a phase position for the generated voltage that has the same phase position as the voltage of the power network. An amplitude lower than 0.8 per unit or, at an amplitude of 0.8 per unit, a deviation from this phase position (in this reasoning on principles, the fact that the phase position must deviate somewhat from the abovementioned phase position to cover active losses in the equipment is still disregarded) would mean that the voltage across the phase inductor Lph would then exceed 0.2 per unit.

For the embodiment of the invention described with reference to FIG. 2, this means, in principle, that the control range of the converter with respect to amplitude is to be limited to 0.33 per unit but with a phase position of the generated fundamental voltage that comprises a phase position that deviates by 180° electrically from the phase position for the voltage of the power network. At a phase position that deviates by 180° from the phase position for the voltage of the power network and an amplitude larger than 0.33 per unit, the voltage across the capacitor C would otherwise exceed 1.33 per unit. The corresponding reasoning applies also to the embodiments of the invention described with reference to FIGS. 3 and 5.

In the above description of embodiments of the invention, losses in the described equipment have not been considered.

However, the converter must also generate a certain active power to cover resistive losses in the equipment. This is achieved in a manner known per se by varying the phase position of the generated voltage relative to the line voltage to phase positions that differ from 0° electrically and 180° electrically. The energy associated therewith is covered by discharge of the dc voltage capacitor, which is therefore arranged with a voltage control for maintaining its dc voltage constant. The voltage generated by the converter will therefore comprise a component with a phase position coinciding with the phase position of the power network or differing therefrom by 180° electrically, and a component with a phase position differing from the phase position for the voltage of the power network by 90° electrically.

For equipment according to the invention, the control range for the converter shall thus comprise generation of a voltage that has a component with a phase position differing by 180° electrically from the phase position for the voltage of the power network.

It is a known phenomenon that power oscillations may arise in transmission lines and that oscillations in the voltage of the transmission line associated therewith may be damped by an exchange of reactive power with the transmission line.

In a further development of the invention, especially advantageous in the above-mentioned application in industrial networks, the fundamental voltage generated by the converter is controlled, in a manner known per se, also to phase positions that lie in either of the intervals 0°–180° electrically and 180°–360° electrically relative to the phase position of the line voltage, and then with an amplitude and a phase angle that, in addition to covering losses in the equipment, permit an exchange of active power with the power network.

Figure 6:
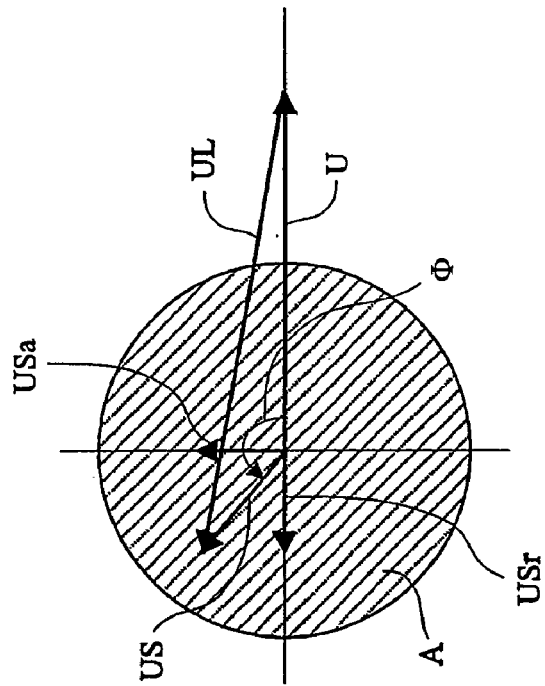
FIG. 6 shows in a vector diagram a relationship between the voltage of the power network and voltage generated by the converter in a further development of the invention.

A vector representation of the voltage ratio in this further development of the invention is illustrated in FIG. 6 (for equipment according to FIG. 5 with the voltage US generated by the converter transformed to the high-voltage side of the transformer). The intersection point between the vertical and horizontal axes constitutes the origin of coordinates for a vector representation of the line voltage U and the horizontal axis represents the phase position of the line voltage. The line voltage and the voltage generated by the converter are shown in the figure by a vector U and a vector US, respectively. The voltage US has the phase position φ relative to the line voltage. The voltage UL across the inductor LC (FIGS. 4 and 5) is represented in the figure by the vectorial difference between vector U and vector US. The circle in the figure indicates the control range A within which the voltage generated by the converter may be controlled with respect to amplitude and phase position.

The amplitude of the reactive component of the current IL (FIGS. 4 and 5), and hence the magnitude of the reactive power that is exchanged with the power network, is dependent on the reactive component USr of the fundamental voltage US along the horizontal axis. The active power exchange with the power network is dependent on the active component USa of the voltage US along the vertical axis.

By control of the voltage of the converter to an arbitrary phase position in relation to the voltage of the power network, both reactive and active power may thus be exchanged with the network.

The extent of the exchange of active power with the power network is determined by the energy storage capacity in the dc circuit of the converter. This dc circuit generally comprises a capacitor CD (FIGS. 1–3 and 5) and based on a given energy that is to be exchanged with the power network, this capacitor may be dimensioned so that the energy exchange may take place with a substantially retained voltage. Briefly, however, the voltage across the capacitor may be allowed to vary typically in an interval of from 0.7 to 1.25 per unit. With regard to stored energy, the capacitor CD may be typically dimensioned such that, at nominal active current, it is discharged from nominal voltage to zero voltage in 5 to 20 ms.

So-called flicker consists of voltage variations in the power network within a frequency range that may be observed by and is disturbing to the human eye in case of electric lighting supplied by the ac network.

For reducing flicker, which typically occurs in applications in industrial networks, it has proved to be advantageous, in addition to compensating the voltage variations by means of exchange of reactive power with the power network, also to introduce a transient exchange of active power in the manner described above.

As mentioned above, the dc voltage capacitor is arranged with a voltage control for maintaining its dc voltage constant, and for achieving the above-mentioned transient exchange of active power with the power network for reduction of flicker, it must be ensured that the voltage control of the dc voltage capacitor does not essentially counteract the interventions from the control system for reduction of flicker.

A specified and standardized disturbance curve, weighed in dependence on the frequency, exhibits a maximum at a frequency of about 8.8 Hz, and a system for reducing flicker should therefore advantageously be active in an interval around this frequency.

Figure 7A:
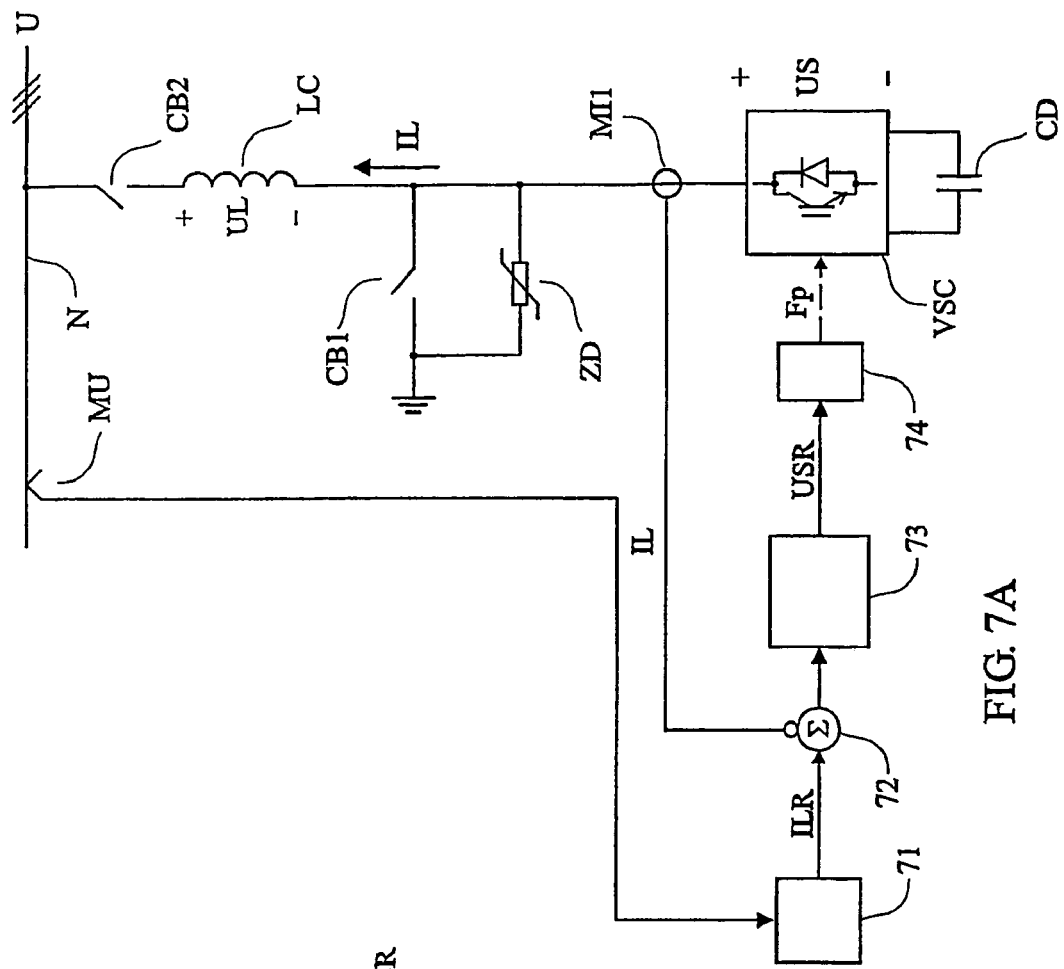
FIG. 7A shows in more detail an embodiment of the invention according to FIG. 3.

FIG. 7A shows in more detail a piece of equipment of the kind described with reference to FIG. 3. A circuit breaker CB1 and a surge arrester ZD connected in parallel therewith are connected between ground and the connection point between the inductor LC and the converter VSC. When starting the equipment, when the circuit breaker CB1 is in a closed position, the inductor LC is connected to the power network via a circuit breaker CB2, whereupon the circuit breaker CB1 is opened. In the event that the dc voltage capacitor CD is then not charged to substantially nominal voltage, for example by means of an external voltage source, the capacitor will be charged via the diodes which, in a known manner, are arranged in an antiparallel connection with the controllable semiconductor elements of the converter. When the voltage of the dc voltage capacitor has substantially reached its nominal value, the control equipment of the converter is deblocked and the converter is brought to generate the voltage US. During the mentioned charging process via the diodes of the converter, active power is thus drawn from the network during a transition period.

In the event that the converter must be blocked, for example due to the occurrence of an internal fault during operation, the voltage US will initially increase due to the current IL through the inductor being rectified via the mentioned diodes. The surge arrester ZD then limits the voltage US to permissible values until the circuit breaker CB1, via protective equipment (not shown), is closed.

Alternatively or as a complement, a surge arrester may be connected across the dc voltage capacitor CD (not shown in the figure) to limit the voltage thereof. As a further alternative for the purpose of limiting the voltage across the dc voltage capacitor, a further converter (not shown in the figure) may be connected to the capacitor to transmit therefrom active power to an electric power network.

The current IL is measured by means of a current-measuring device MI1. A superordinate control member 71 forms, in some manner known per se, in dependence on electric variables such as current and voltage measured in the power network and on reference values not shown, a reference value ILR for the current IL. In FIG. 7A, this is exemplified such that a value of the voltage U, sensed by means of a voltage-measuring device MU, is applied to the control member 71.

The reference value ILR for the current IL and the sensed value of the current thereof are supplied to a difference-forming member 72, and the difference is supplied to current control system 73 designed in some manner known per se. The current control system forms, in a manner also known per se, reference values USR for the three phase voltages of the converter. The reference values USR are supplied to a modulating unit 74, which, in accordance with a chosen pattern for pulse-width modulation, forms firing pulses Fp to the controllable semiconductor elements of the converter.

Devices in the control system known to the person skilled in the art, such as, for example, for synchronization of the voltage of the converter with the voltage of the power network with respect to frequency and phase position, are not shown in this figure.

Figure 7B:
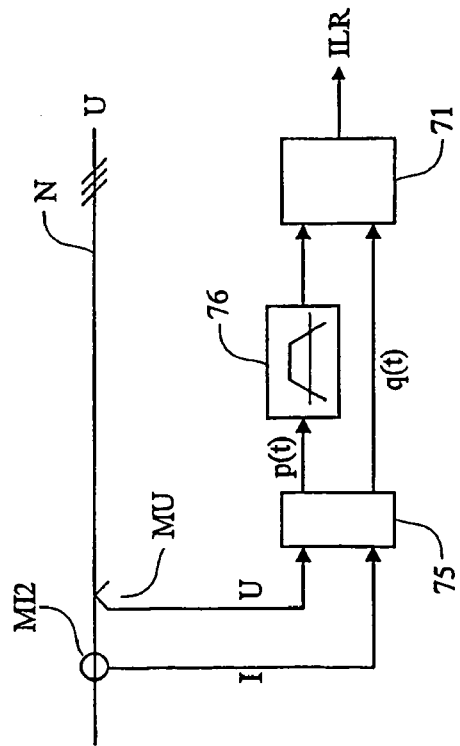
FIG. 7B shows details of an embodiment of a control system for an embodiment of the invention according to FIG. 7A.

In FIG. 7B, parts of a control system, known per se, for reducing flicker are illustrated. The voltage U and the current I are sensed at a point in the power network N by means of the voltage-measuring device MU and a current-measuring device MI2. The sensed values of current and voltage are supplied to a calculating member 75 which, in some manner known per se, forms values p(t) of active power flow and q(t) of reactive power flow at the measuring point.

A signal-processing member 76 is provided with a transfer function that renders the control system active in the frequency interval that is of interest for reducing flicker. Preferably, the member 76 is provided with a phase-advancing (deriving) characteristic in a frequency interval around the frequency 8.8 Hz such that its transfer function H(s) comprises a term of the form $H(s)=K(1+sT1)/(1+sT2)$, where s is the Laplace operator, K an amplification factor and T1 and T2, with T2<T1, time constants corresponding to said frequency interval.

The amplitude amplification for the member 76 as a function of the frequency is indicated in the block 76 in the figure.

The signal-processing member 76 is supplied with the value p(t) and forwards to the superordinate member 71 essentially those components of the active power flow that lie within the mentioned frequency interval. The superordinate control member 71 is also supplied with the value q(t) and forms from the values supplied thereto, in some manner known per se, a reference value ILR for the current IL. The reference value thus formed will thus comprise one active and one reactive component of the current IL and will result in both an active and a reactive component of the fundamental voltage.

The invention is not limited to the embodiments shown but the person skilled in the art may, of course, modify it in a plurality of ways within the scope of the invention as defined by the claims.

With equipment and a method according to the invention, the following advantages, inter alia, are obtained.

In case of a transformerless connection of the converter to the reactive impedance element, a converter for a lower nominal voltage and a correspondingly higher current may be utilized, compared with the prior art. This makes possible a better utilization of the converter and hence normally a lower installation cost for the equipment.

For those cases where the voltage level of the power network requires connection of the converter to the reactive impedance element via a transformer, this transformer may be designed for a primary voltage that is considerably lower than the nominal voltage of the power network.

In shunt inductors arranged in transmission lines, a possibility of a rapid and continuous control of the current through the inductor is created, which control may be utilized for reducing overvoltages caused, for example, by switching operations in the power network, damping of power oscillations in the transmission line, and for voltage control in case of a varying transmission of power in the transmission line.

Existing shunt inductors may be supplemented in a simple manner by a voltage source converter with a control range according to the invention.

With the further development of the invention where the control range of the converter also comprises generation of an active component (USa) of the fundamental voltage with a phase position that deviates from the phase position for the voltage of the power network by +90° electrically or −90° electrically and with an amplitude that brings about an exchange of active power with the power network, the equipment may be utilized for damping flicker, by being provided with a superordinate control member in a manner known per se, by a transient exchange of active power with the power network.

What is claimed is:

1. Equipment for exchanging power, in shunt connection, with an electric power network, the power network having a nominal voltage of a fundamental frequency and a given phase position, the equipment comprising:
a reactive impedance element comprising a capacitor, and
a voltage source converter for mutual connection in series, the converter being intended for generation of a fundamental voltage within a control range that limits the amplitude of the generated fundamental voltage, wherein the control range of the converter limits the amplitude of the fundamental voltage to a value that is lower than the nominal voltage of the power network and comprises generation of a reactive component of the fundamental voltage with a phase position that either coincides with the phase position for the voltage of the power network or that deviates by 180° electrically from the phase position for the voltage of the power network.

2. The equipment according to claim 1, wherein the control range of the converter comprises, in addition thereto, generation of an active component of the fundamental voltage with a phase position that deviates from the phase position for the voltage of the power network by +90° electrically or by −90° electrically and with an amplitude that brings about an exchange of active power with the power network.

3. The equipment according to claim 1, wherein the converter comprises a control system for controlling the fundamental voltage generated by the converter with respect to amplitude and phase position within the control range, in dependence on electric variables sensed in the power network.

4. The equipment according to claim 3, wherein the control system comprises means for forming a reference value for the current of the converter, in dependence on a voltage variation sensed in the power network, said reference value resulting in both an active and a reactive component of the fundamental voltage.

5. Use of equipment according to claim 1 for exchange of reactive power with an electric power network.

6. Use of equipment according to claim 1 in transmission lines for reducing overvoltages, for damping power oscillations, and for voltage control at varying transmission of power in the transmission line.

7. Equipment for exchanging power, in shunt connection, with an electric power network, the power network having a nominal voltage of a fundamental frequency and a given phase position, the equipment comprising:

a reactive impedance element comprising an inductor, a voltage source converter for mutual connection in series, the converter being intended for generation of a fundamental voltage within a control range that limits the amplitude of the generated fundamental voltage, wherein the control range of the converter limits the amplitude of the fundamental voltage to a value that is lower than the nominal voltage of the power network and comprises generation of a reactive component of the fundamental voltage with a phase position that either coincides with the phase position for the voltage of the power network or that deviates by 180° electrically from the phase position for the voltage of the power network, and a transformer connected between the inductor and the converter.

8. Use of equipment according to claim 7 in transmission lines for reducing overvoltages, for damping power oscillations, and for voltage control at varying transmission of power in the transmission line.

9. Equipment for exchanging power, in shunt connection, with an electric power network, the power network having a nominal voltage of a fundamental frequency and a given phase position, the equipment comprising:

a reactive impedance element, and a voltage source converter for mutual connection in series, the converter comprising a control system for controlling the fundamental voltage generated by the converter with respect to amplitude and phase position within the control range in dependence on electric variables sensed in the power network, the control system comprising means for forming a reference value for the current of the converter in dependence on a voltage variation sensed in the power network, said reference value resulting in both an active and a reactive component of the fundamental voltage, the converter being intended for generation of a fundamental voltage within a control range that limits the amplitude of the generated fundamental voltage, wherein the control range of the converter limits the amplitude of the fundamental voltage to a value that is lower than the nominal voltage of the power network and comprises generation of a reactive component of the fundamental voltage with a phase position that either coincides with the phase position for the voltage of the power network or that deviates by 180° electrically from the phase position for the voltage of the power network, wherein said means for forming a reference value in the control system comprises means for forming, in dependence on a sensed current and a sensed voltage in the power network, a value of active power flow in the power network, a signal-processing member with a phase-advancing characteristic in a frequency interval surrounding the frequency 8.8 Hz which is supplied with said value of active power flow in the power network, and means for forming the reference value for the current of the converter in dependence on an output signal from said signal-processing member.

10. Use of equipment according to claim 9 for exchange of active power with a power network for reducing flicker.

11. A method for exchanging power, in shunt connection, with an electric power network with a nominal voltage of a fundamental frequency and a given phase position, the method comprising:

connecting a reactive impedance element and a voltage source converter to each other in series connection and in shunt connection to the power network, wherein the converter generates a fundamental voltage within a control range that limits the amplitude of the generated fundamental voltage, wherein the converter comprises a control system for controlling, in dependence on electric variables sensed in the power network, the fundamental voltage generated by the converter, with respect to amplitude and phase position, within the control range, choosing the control range of the converter such that the generated fundamental voltage is lower in amplitude than the nominal voltage of the power network, and comprises generation of a reactive component of the fundamental voltage with a phase position that either coincides with the phase position for the voltage of the power network or that deviates by 180° electrically from the phase position for the voltage of the power network, forming a value of active power flow in the power network, supplying said value of active power flow in the power network to a signal-processing member with a phase-advancing characteristic in a frequency interval surrounding the frequency 8.8 Hz, a reference value for the current of the converter is formed in dependence on an output signal from said signal-processing member, which reference value results in an active component of the fundamental voltage generated by the converter achieving a reactive power exchange with the power network by controlling the fundamental voltage generated by the converter within the control range.

12. The method according to claim 11, wherein the control range of the converter is chosen such that, in addition thereto, it comprises generation of an active component of the fundamental voltage with a phase position that deviates from the phase position for the voltage of the power network by +90° electrically or by −90° electrically, whereby an active power exchange with the power network is achieved by controlling the voltage generated by the converter, with respect to its amplitude, within the control range and to a phase position that deviates from the phase position for the voltage of the power network by +90° electrically or by −90° electrically.

* * * * *